Dec. 3, 1963     C. C. COLLINS     3,112,851
METHOD OF AND APPARATUS FOR DEBURRING RUBBER-LIKE ARTICLES
Filed Jan. 28, 1960     5 Sheets-Sheet 1

INVENTOR.
CAMERON C. COLLINS
BY
ATTORNEYS

INVENTOR.
CAMERON C. COLLINS

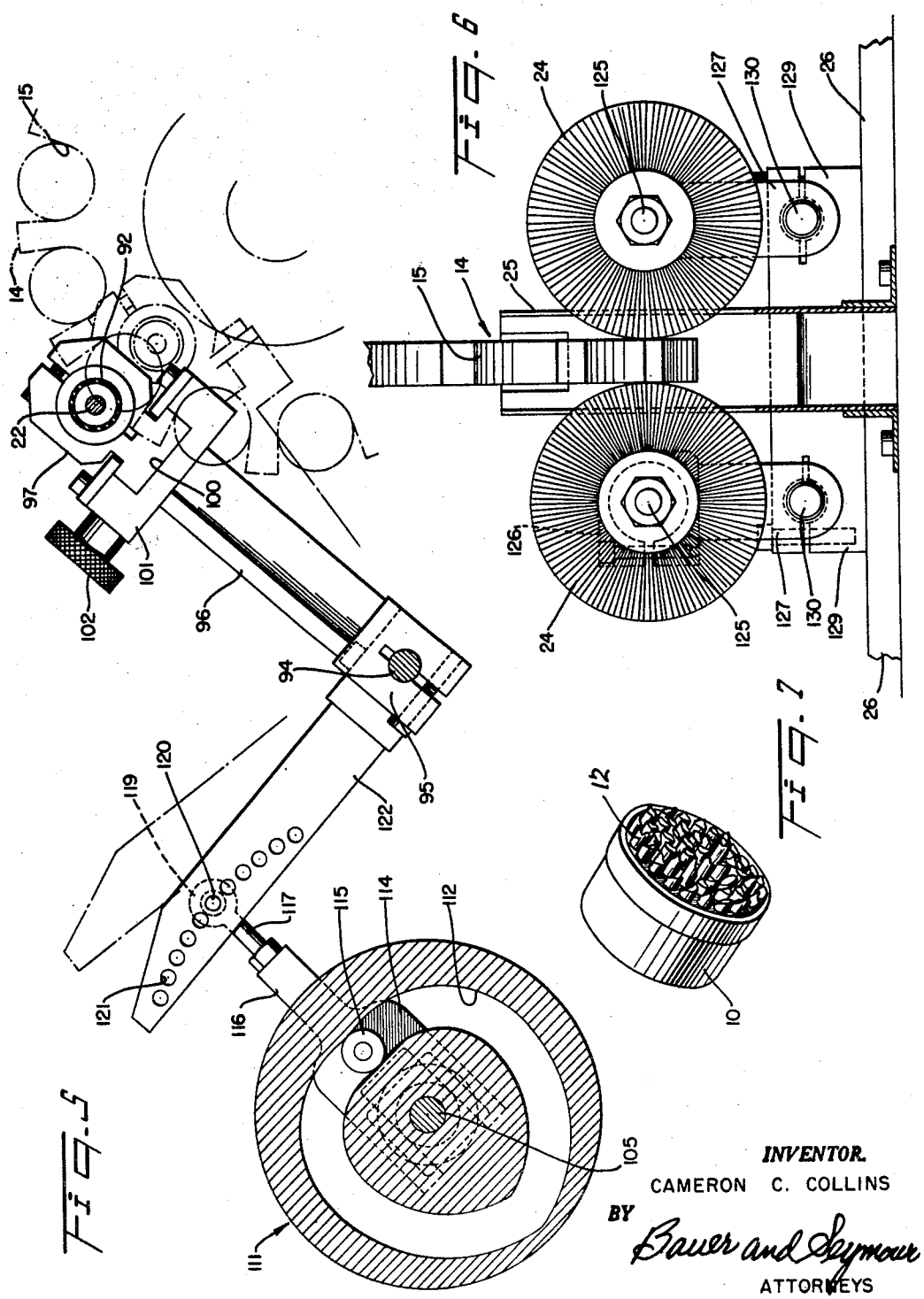

United States Patent Office 3,112,851
Patented Dec. 3, 1963

3,112,851
METHOD OF AND APPARATUS FOR DEBURR-
ING RUBBER-LIKE ARTICLES
Cameron C. Collins, Bainbridge, N.Y., assignor to The
Bendix Corporation, a corporation of Delaware
Filed Jan. 28, 1960, Ser. No. 5,152
25 Claims. (Cl. 225—4)

This invention relates to an improved method of and apparatus for removing burrs from rubber-like articles. Such burrs may occur, for example, as a result of the molding of the articles, the rubber-like material tending to leak somewhat between mold parts, core pins, and the like, to form thin adherent flash or burrs.

The invention has among its objects the provision of an improved method of removing burrs from rubber-like articles, such method being particularly characterized by the speed and economy with which it may be practiced.

A further object of the invention lies in the provision of an improved method of the character indicated wherein the burrs may be removed in a thoroughly efficient manner, and without any injury to any of the surfaces surrounding or adjacent to the roots of the burrs.

Yet another object of the invention lies in the provision of an improved method of removing burrs from rubber-like articles wherein surfaces adjacent the roots of the burrs are hardened before the burrs are removed therefrom, so that injury to such surfaces by the burr-removing tool or tools is prevented.

Yet another object of the invention lies in the provision of an improved apparatus for removing burrs from one or more surfaces of rubber-like articles.

A further object lies in the provision of an improved apparatus and the type indicated which is economical to construct, maintain, and operate, may be operated for long periods free from the necessity of maintenance, and which operates thoroughly and completely to remove burrs from the article while protecting surfaces of the article adjacent the roots of the burrs from damage.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a fragmentary enlarged view in elevation of the article-gripping and conveying mechanism of the apparatus, and of portions of the mechanism which co-operate therewith to chill and harden the burrs and adjacent surfaces of the article and to bend and break the burrs therefrom;

FIG. 5 is an enlarged fragmentary view in vertical transverse section through the portion of the apparatus which drives the burr-removing brushes in an oscillatory path across the articles being treated;

FIG. 6 is an enlarged fragmentary view of the apparatus in front elevation, showing the construction and manner of operation of the means removing the articles from the article-gripping conveyor after the burrs have been removed from the articles;

FIG. 7 is a view in perspective of a typical molded rubber-like article before the flash burrs have been removed therefrom;

Figure 1:
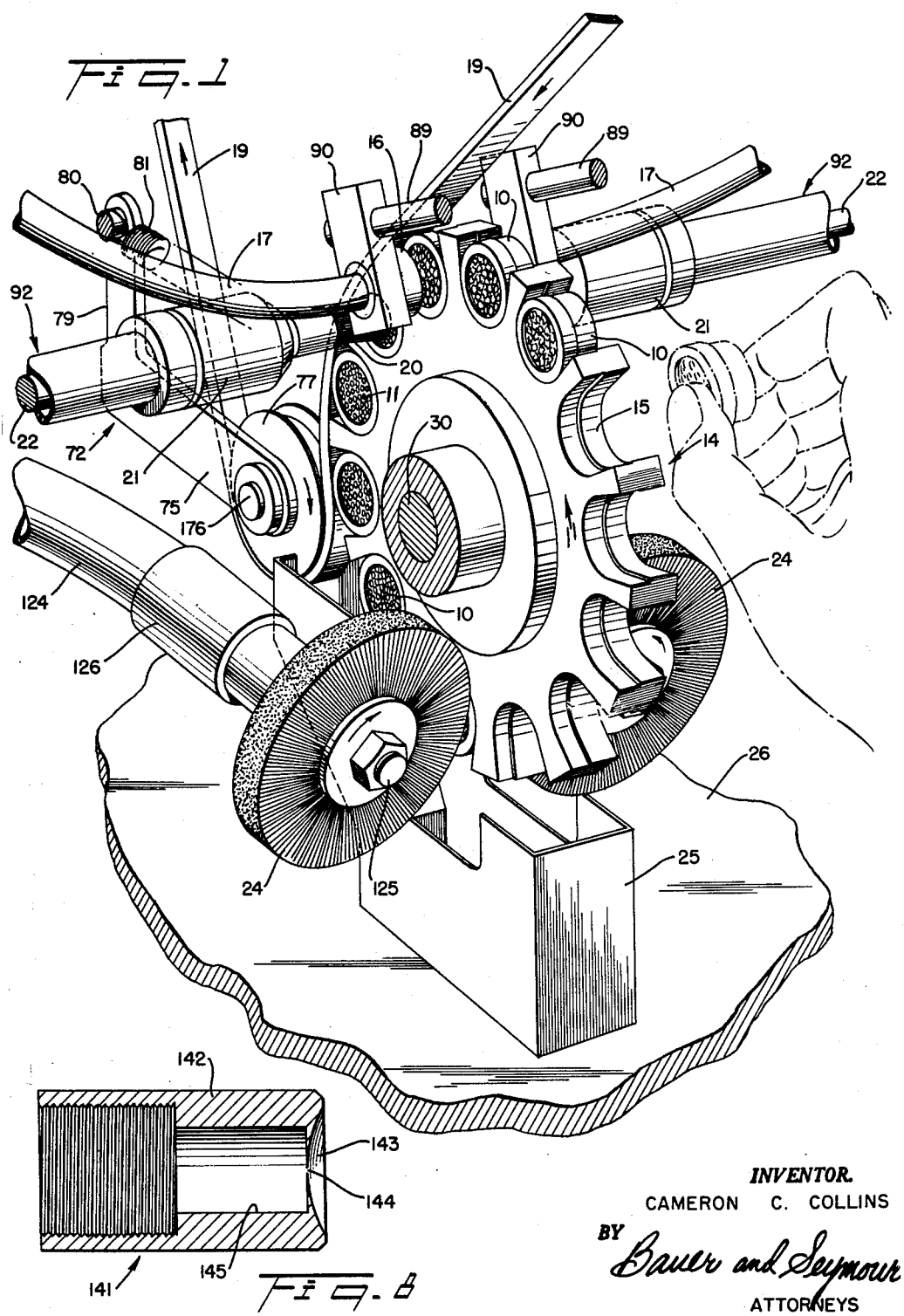

FIG. 8 is an enlarged view in axial section through a cooling medium spray nozzle employed with the apparatus of the invention as it is shown in FIGS. 1–7, inclusive, such nozzle being adapted for the spraying of liquid $CO_2$; and FIG. 9 is a view in axial section through a cooling medium spray nozzle which may be alternatively employed with the apparatus of the invention, such nozzle being adapted for spraying a cooling medium such as liquid nitrogen.

As indicated above, flash burrs are a frequent problem in the molding of rubber-like parts. The problem is more acute with some types of rubber-like materials than with others, and becomes more severe with increasing complexity of the molded article. The problem is particularly severe with molded rubber-like inserts for multiple-contact connectors such as that shown in FIG. 7. Such insert, which is designated 10, has a plurality of contact-receiving passages 11 therein. Each such passage is formed by a pin core in the mold, such core pin fitting the mold with a predetermined tolerance to allow the escape of air from the mold cavity or cavities; when the material to be molded is subjected to pressure, it tends to leak or extrude to some extent about each pin, thereby forming the flash or burrs, at least some of which have roots, designated 12, which extends from each end of the passage, assuming that the passage extends completely through the insert.

Obviously such flash or burrs must be removed from the inserts before the inserts can be used. To be at all feasible the method of removing the flash or burrs must be such as not to damage other surfaces of the inserts. Thus the small identification letters or numbers which are frequently employed to identify each of the passages on the inserts must not be damaged, and the smooth molding skin on the insert, including that on the end surfaces thereof, must not be scratched or otherwise damaged.

The most frequently employed method for removing such flash or burrs was a mechanical one involving pulling and/or cutting the flash off the end surfaces of the insert, and pushing it out of the passages, where necessary, by a suitable pin or the like to permit its removal by pulling or cutting. Such method of removal of flash was slow, flash removal was frequently incomplete, and the rate of rejection of parts because of damage sustained during flash removal was high.

In accordance with the present invention, flash or burrs are removed from rubber-like articles by first markedly chilling the flash or burrs and surfaces of the article adjacent thereto. Following this, the flash or burrs are subjected to bending and shearing forces, whereby to break them off at their roots. Such latter step is preferably carried out by a tool moving relative to the articles; for this purpose a brush having bristles whose ends engage the end surface of the article has proved to be particularly satisfactory. Use of the method and the apparatus of the present invention has resulted in the production of superior, undamaged articles, has greatly reduced the amount of time necessary to remove flash or burrs, and has very drastically reduced the percentage of articles which must be rejected because of damage thereto.

Turning now to the drawings, the flash or burr-removing station of the apparatus is shown most clearly in FIG. 1. In such figure there is shown an article-gripping conveyor in the form of a wheel 14 which is provided with a plurality of angularly spaced, radially disposed U-shaped notches or pockets 15 in the periphery thereof.

Wheel 14 has a thickness which substantially equals the length of the inserts 10 (FIG. 7) which are to be treated, and the pockets 15 are of such size as snugly to engage the inserts mounted therein in the manner shown in FIG. 1. As thus mounted, the two end surfaces of the insert 10 lie substantially flush with the opposite side surfaces of wheel 14, and are exposed for treatment in the apparatus to remove the flash therefrom. In the preferred construction of the machine, wheel 14 is made readily removable from the mounting and driving shaft therefor, so as to allow the substitution of other article-gripping and conveying wheels having thicknesses and peripheral pockets therein appropriate for the reception and treatment of rubber-like articles of different sizes and shapes.

Articles to be treated are loaded into pockets 15 on wheel 14 as the wheel travels slowly upwardly from the lowermost, article-discharging, station thereof. Such article-loading operation is schematically depicted in FIG. 1. Articles thus loaded into wheel 14 are carried thereby upwardly past two opposed chilling heads 16 which are disposed on opposite sides of the wheel at the top thereof. Each of such heads 16 is supplied with gas such as carbon dioxide under pressure through pipe 17. The discharge end of each head 16 is flared outwardly to a diameter which generally approximates that of the article being treated, the discharge end of the head lying close to but spaced from the respective end surface of the article. The discharge end of each chilling head may be made readily removable so as to be replaced by discharge ends of different sizes and shapes where markedly different sized and shaped articles are to be treated.

Substantially the rear upper quadrant of wheels 14 runs in contact with a hold-down belt 19 which closes the outer ends of the pockets 15 and prevents the escape of articles 10 therefrom while they are being treated at the flash or burr-removing station. At such station there is disposed an end brush 20 on each side of the article, in the embodiment shown such brush having a single tuft of bristles disposed normal to the plane of rotation of wheel 14 and secured in a chuck 21 on the outer end of a flexible shaft 92 having an inner driven central element 22 therein. Each of the brushes 20, which is driven at high speed by mechanism to be described, is oscillated in a plane parallel to the plane of travel of wheel 14, such oscillataion having an amplitude sufficient fully to cover the entire surface of the article being treated.

After reaching a position somewhat below the rear upper quadrant of its travel, the wheel 14 leaves hold-down belt 19, so that the treated articles 10 are now free for removal from the pockets 15 on the wheel. To insure the removal of the articles, the effect of gravity thereon is supplemented by two oppositely rotating disc-like brushes 24 which are fixedly positioned on the forward ends of driven shafts 125 disposed at right angles to the axis of shaft 30 mounting wheel 14. Brushes 24 are disposed so that their inner confronting peripheral portions engage the opposite ends of articles 10, the direction of rotation of brushes 24 being such as to impel the articles downwardly out of pockets 15. A suitable container 25, having its upper side edges notched to receive brushes 24, may be disposed below wheel 14 to receive the discharged treated articles. Container 25 may, if desired, be the upper end of a conduit which leads the articles to a suitable container.

Figure 2:
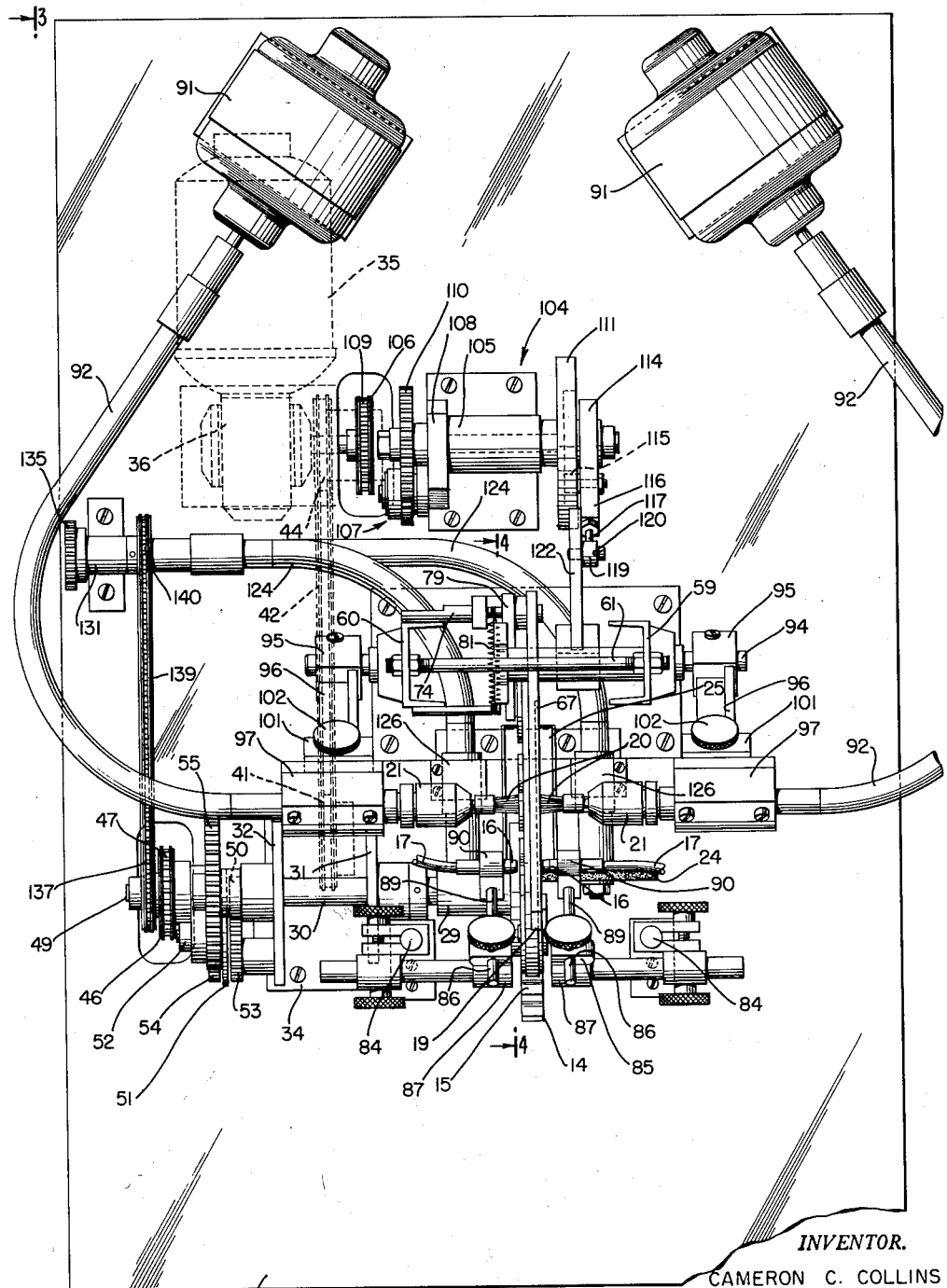
FIG. 2 is a fragmentary view in plan of the illustrative embodiment of the apparatus of the invention.
Figure 3:
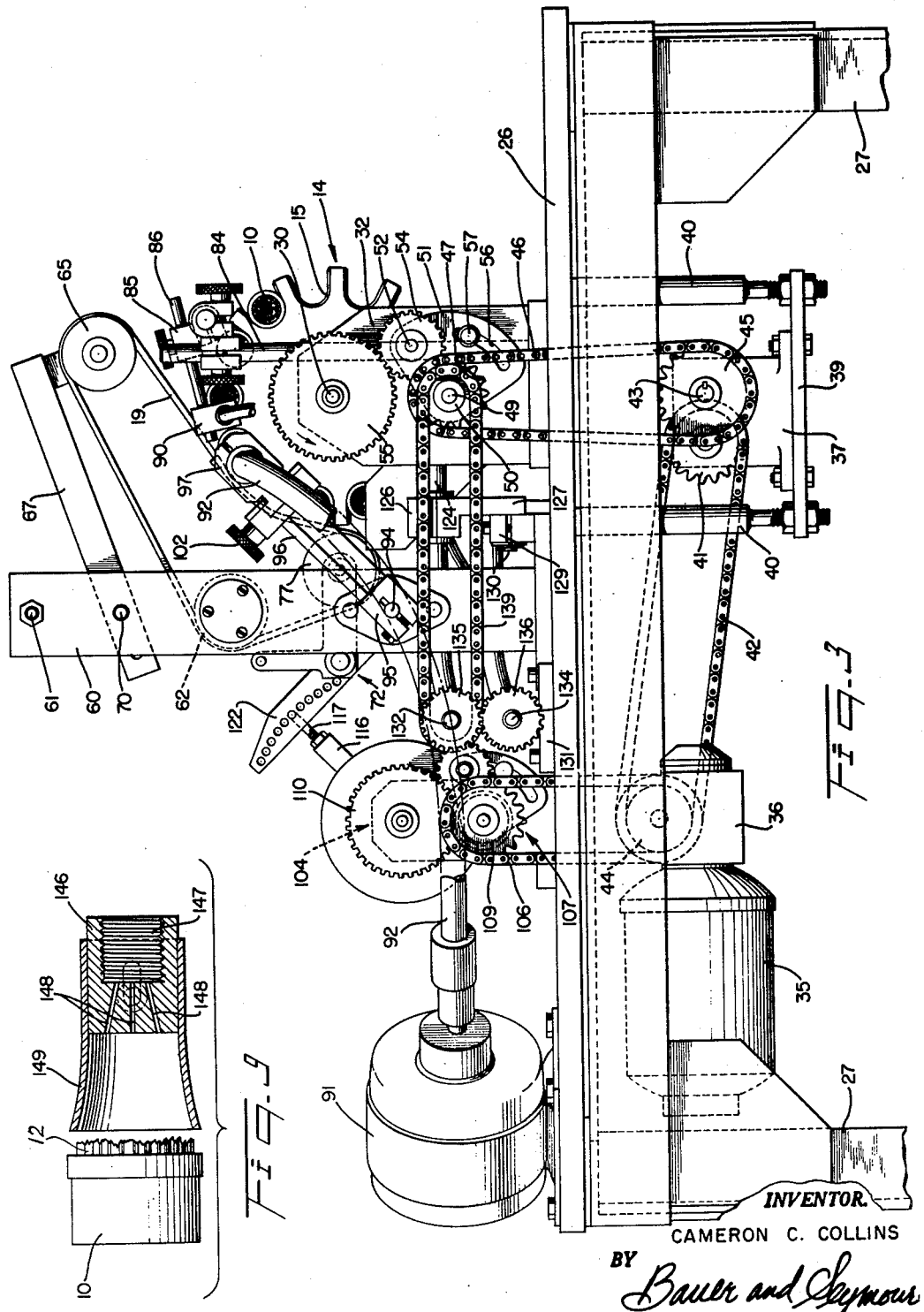
FIG. 3 is a view in side elevation of such apparatus, the view being taken from the line 3—3 of FIG. 2, certain of the parts being partially broken away for clarity of illustration.
Figure 4:
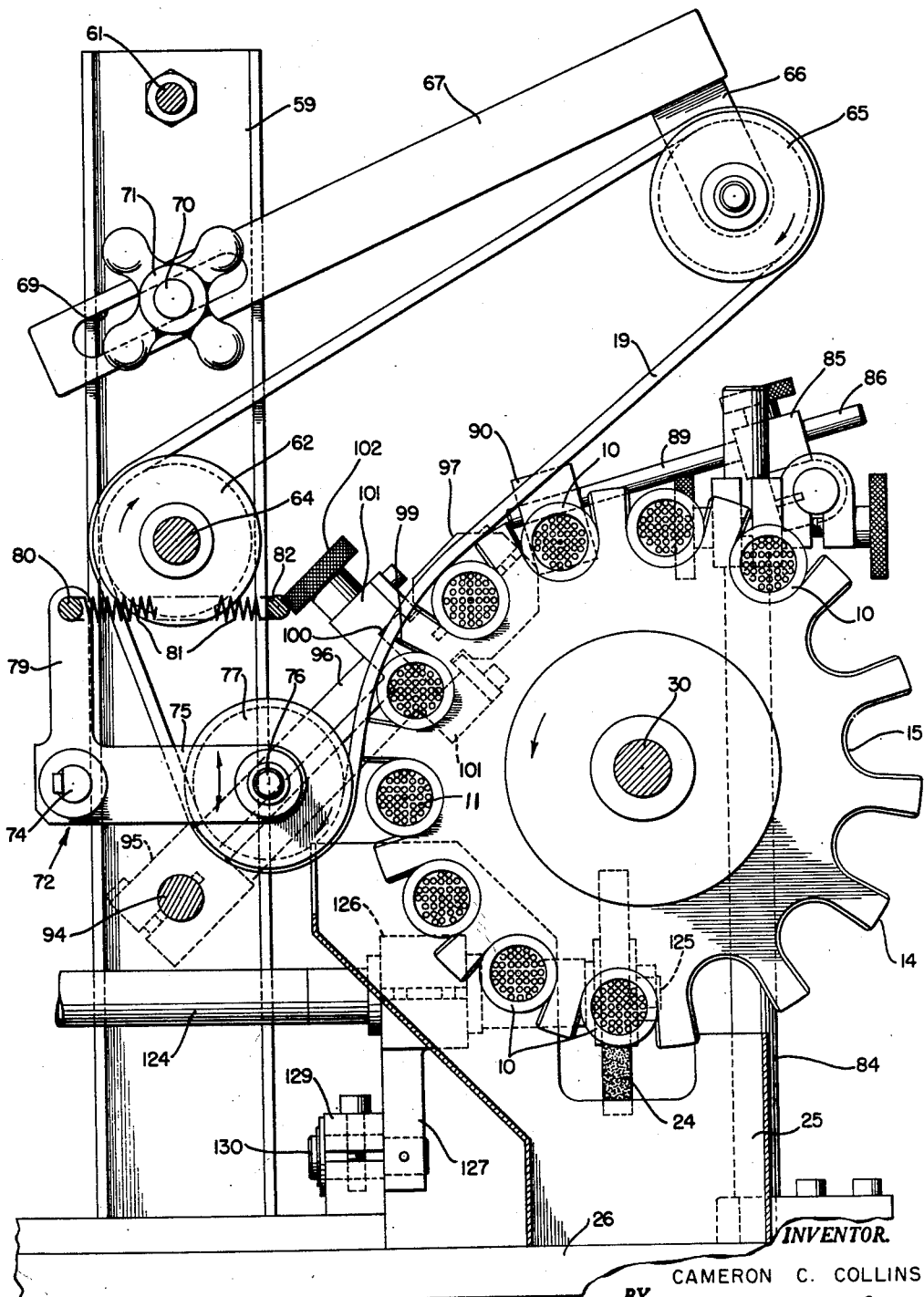
FIG. 4 is an enlarged view in transverse vertical section through a portion of the apparatus shown in FIGS. 2 and 3, the section being taken along the line 4—4 of FIG. 2.

As shown in FIGS. 2 and 3, the apparatus is mounted upon a flat base 26 which is in the form of a table having legs 27 at its corners. Most of the apparatus is disposed on top of member 26; a few of the operating elements are disposed therebeneath as shown in FIG. 3. Rising above member 26 is a main bracket 34 having a base secured to member 26 and two laterally spaced upstanding flanges 31 and 32 connected to such base. The supporting shaft 30 for the wheel 14 extends through ends journalled in bearings attached to flanges 31 and 32. The hub 29 on shaft 30 to which wheel 14 is secured is located to the right of the bearing attached to flange 31, as shown in FIG. 2.

Shaft 30 is driven by a motor 35 disposed beneath supporting member 26. Motor 35 has a speed reducer 36 connected thereto, the output shaft of reducer 36 being drivingly connected to the input shaft of a further, serially connected, speed reducer 37. The latter speed reducer is mounted upon a sub-platform 39 which is slung below supporting member 26 on four depending studs 40 connected thereto. Specifically, the two speed reducers are connected by a drive chain 42 entrained over a sprocket 41 on the input drive shaft of speed reducer 37 and a sprocket 44 on the output drive shaft of speed reducer 36. Speed reducer 37 has an output shaft 43 upon which is mounted a sprocket 45. A horizontal jackshaft 49 is journalled in a bearing structure connected to the outer flange 32 of bracket 34. Shaft 49 is driven from shaft 43 through the medium of a drive chain 46 which is entrained over sprocket 45 on shaft 43 and sprocket 50 on shaft 49.

Interposed between jackshaft 49 and shaft 30, upon which wheel 14 is mounted, is a change-speed gear arrangement which permits the operating speed of wheel 14 to be changed as desired while allowing the speed of motor 35 and the speed reduction ratios of devices 36 and 37 to be maintained constant. As shown in FIG. 2, there is a gear 50 affixed to shaft 49. A sector plate 51 is mounted for pivotal movement around shaft 49, such sector plate carrying a removable two-step gear having one pinion thereof in mesh with gear 50 and the other pinion in mesh with gear 55 secured to the outer end of shaft 30. With such arrangement there can be secured a substantial range of speed variation between shafts 49 and 30 with a suitable choice of the sizes of the pinions in the two-piece gear set. In the embodiment shown, the two-piece gear set is rotatably mounted upon a stub shaft 52 on sector plate 51, a pinion 54 of the gear set meshing with gear 53 thereof meshing with gear 50 and a larger gear 54 thereof meshing with gear 55. The sector plate 51 is mounted in the required position to secure such meshing engagement between gears 54 and 55 by a stud 57 which extends through an arcuate slot 56 in plate 51 and is screwed into upstanding flange 32. The tightening of stud 57 against the sector plate retains it in the required position.

Rearwardly of the article-conveying wheel 14 there are disposed two vertical columns 59 and 60 which are attached at their bases to supporting member 26 and which are located generally at equal distances on opposite sides of the vertical mid-plane of wheel 14. Columns 59 and 60 are secured together in vertical parallel position as by means of tie rods, of which one is shown at 61. The columns 59 and 60 function to support hold-down belt 19, and to provide for the adjustment and tensioning thereof, in a manner which is shown more particularly in FIG. 4. As there shown, a fixed pulley 62 is journalled between the columns on a shaft 64 which extends therebetween. Suitable means is provided to maintain the pulley 62 aligned with the wheel 14. A forward upper hold-down belt pulley 65 likewise derives its support from the columns 59 and 60. Pulley 65 is mounted between the ears of a generally U-shaped bracket 66 which is secured to the forward end of overarm 67. Such overarm has a longitudinally extending slot 69 through its rear end, the overarm being supported by a shaft 70 which extends through such slot and is supported at its ends by columns 59 and 60. Shaft 70 is mounted in the columns so as to be prevented from rotation with respect thereto. Overarm 67 is maintained in alignment with the wheel 14 as by means of nuts screwed on shaft 70 on both sides of the overarm. One of such nuts, designated 71, is in the form of a wing nut so as to allow the overarm readily to be loosened with respect to shaft 70, to be adjusted to the required angularity and forward positioning, and thereafter to be secured in adjusted position.

Belt 19 is constantly maintained under tension by a mechanism including a bellcrank 72 which is pivoted at its bight on a horizontal shaft 74 which is supported in bearings affixed to the rear edges of columns 59 and 60. The bellcrank has a horizontal arm 75, the forward end of which is slotted to provide ears between which there is positioned a guide pulley 77 which is rotatably secured to arm 75 by a stub shaft 76 through the ears thereof. The other, vertical arm 79 of bellcrank 72 has a cross pin 80 in the upper end thereof. A coil tension spring 81, extending between pin 80 and a fixed pin 82 secured to the forward edges of the columns 59 and 60 constantly urges the bellcrank in a counterclockwise direction, thereby feasibly to press the belt 19 into engagement with a portion of the rear upper quadrant of article-carrying wheel 14.

At the forward portion of the machine, and on each side of the wheel 14 thereof, there are located vertical supports in the form of rods 84. The bottom ends of such rods are secured to supporting member 26 by suitable brackets, as shown. Rods 84 serve as supports upon which the article-chilling gas discharge heads are adjustably mounted. Vertically adjustably secured to each rod 84 is a clamp 85 which serves, in turn, to support a horizontal shaft 86 adjustably secured in clamp 85. Further clamps 87, secured to the inner ends of rods 86, carry rearwardly directed rods 89 upon the rear ends of which are mounted fittings 90 which serve as supports for the gas discharge heads 16. It will be seen that such manner of support of the gas discharge heads affords them easy adjustability in three directions, that is vertically, horizontally, and angularly, about the axis of shafts 86. As a result the gas discharge heads may readily be changed, when necessary, and adjusted to cooperate with a great variety of shapes and sizes of rubber-like articles undergoing a deburring operation. Each of brushes 20 is driven by its individual motor 91, which, as shown, is mounted upon the rear of supporting member 26. The drive shafts of the respective motors are connected through flexible shafts 92 to the chucks 21 for the brushes, thereby allowing the brushes to be oscillated during the operating cycle without moving the motors.

The brushes are supported and are oscillated by mechanisms shown more particularly in FIGS. 3 and 5. As there shown, there is a cross shaft 94 which is journalled in the two opposed columns 59 and 60. To such shaft, at positions on each side of the wheel 14, there is secured an operating and supporting arm 96 for the respective brush. The lower, rear end of each arm is provided with a slit clamp means 95 by which it is secured to shaft 94. The upper forward end of each arm 96 is provided with an enlarged head 101 which is provided with a re-entrant guideway 100 extending normal to the plane of the wheel 14. A clamping bracket 97 has a split forward and upper end portion clampingly engaging the flexible shaft 92 outwardly of the chuck 21 thereon. The bottom or rear end of bracket 97 has a T-shaped portion which accurately and slidingly fits within the guideway 100 on bracket 97. The bottom of slide 99 is provided with a longitudinally extending rack gear (not shown) which meshes with a pinion (not shown) on an adjusting shaft 102 journalled in the head 101 of arm 96. As a result of such construction, each of brushes 20 may readily be adjusted toward or away from the respective broad surface of wheel 14, whereby to allow the brush to be adjusted to its most efficient burr removing position, and also from time to time to be adjusted longitudinally to compensate for its wear.

During operation of the apparatus the brushes 20 oscillate in timed relation to the rotation of wheel 14 from the upper, solid line position of FIG. 5 to the lower position thereof fragmentarily indicated in dot dash lines in such figure. The mechanism for thus driving the brushes includes a bracket 104 which is secured to horizontal support 26. Bracket 104 has an upstanding flange 108 having a bearing secured thereto in which is journalled a cross shaft 105. Shaft 105 is driven by motor 35 through the medium of a chain 106 entrained over a sprocket coaxial of and drivingly connected to the above-described sprocket 44 on change speed device 36. The upper end of chain 106 runs over a sprocket 109 which is secured to a stub shaft fixedly journalled in flange 108 of bracket 104. A change speed mechanism 107, similar to the mechanism-connecting shafts 49 and 30, which has been described above, is provided drivingly to connect sprocket 109 and a gear 110 affixed to shaft 105. By a suitable choice of the removable two-piece gear of means 107, the shaft 105 may be driven at the desired speed for the operation in hand.

On the end of shaft 105 remote from gear 110 there is secured a double-acting or scroll cam 111 having a cam track 112 in the outer face thereof. Cam 111 is provided with an enlarged hub on its outer end, such hub serving to guide the opposite arms of the lower fork end 114 of a thrust rod 116. Centrally of the bight portion of end 114 of the thrust rod there is journalled a roller 115 which accurately fits within the cam track 112. The upper forward end of thrust rod 116 is provided with a stem 117 which is adjustably secured to element 116 as by being threaded thereinto. The upper end of element 117 has an eye member 119 which receives a pin 120 which extends through the eye and into one of a series of arcuately spaced holes 121 on the rear end of a lever arm 122. Lever arm 122 is clamped to rock shaft 94 by a split clamp device similar to clamp 95.

It will be apparent that, upon rotation of shaft 105 and of the cam 111 connected thereto, the arm 122 will be moved between the full line position thereof shown in FIG. 5 and its dot dash position also there shown, which corresponds respectively to the full line and dot dash line positions of the brush-holding member 97 in such figure. It will be obvious that the length of the oscillatory path of the brushes 20 may be varied by changing the location at which thrust rod 117 is connected to lever arm 122. Thus when the connection is made at the upper rear end of arm 122 the brushes move through their shortest path, and when the connection is made at the hole 121 closest to shaft 94 the brushes 20 move through their longest path. The length of the path of oscillation of the brushes is chosen so as completely to cover the face or faces of the articles being deburred by the brushes.

To insure the removal of the treated, deburred articles from the pockets 15 in the wheel 14, there are provided brushes 24 which engage such articles on opposite sides thereof at the bottom of wheel 14, and thrust the articles downwardly out of the pockets. Such article-discharging brushes 24, shown most clearly in FIG. 6, are mounted upon the forward ends of flexible shafts 125. Such shafts are provided with outer flexible casings 124, as shown in FIGS. 1 and 2. The forward end of each of the flexible shafts 124, 125 is supported in a split clamp 126 on the upper end of a vertical arm 127. Arms 127, in turn, are pivotally connected at their lower ends by stub shafts 130 to supporting brackets 129 which are secured as shown to the horizontal supporting member 26. Such construction allows the axes of the brushes 24 to be shifted toward or away from the wheel 14, thereby to adapt the machine for the treatment of articles of various sizes and shapes.

The article-extracting brushes 24 are driven by the mechanism more clearly shown in FIGS. 2 and 3. An upstanding bracket 131 has two horizontally disposed stub shafts 132 and 134 projecting therefrom, the inner ends of such shafts being connected to the rear ends of the respective flexible shafts 124, 125. The outer ends of shafts 132 and 134 have meshing gears 135 and 136, respectively, secured thereto, so that the two flexible shafts and the brushes 24 driven thereby rotate in unison.

The two flexible shafts 124, 125 are driven by means of a chain 139 which is entrained over a sprocket 137 on shaft 49 and over a sprocket 140 on the inner end of the upper stub shaft 132.

The chilling heads 16, when employed with a gas such as $CO_2$, which in expanding from a liquid pass through a solid phase, are provided with spray nozzles such as shown in FIG. 8. The nozzle 141 there shown has a hollow generally cylindrical body 142 having a passage 145 disposed longitudinally therein. The outer end of such passage is substantially closed by an end partition 143. A thin fish-tail slot 144 is provided centrally of partition 143, whereby to provide a spray jet of fan shape. Such jet is disposed with its broad extent generally vertical in FIG. 1, whereby fully to cover the exposed ends of inserts 10 as the latter travel past the nozzles.

The manner of operation of the deburring apparatus of the described embodiment of the invention is believed to be obvious from the above description. It will be well, however, to point out a few of the salient advantages of the method and apparatus. Liquid $CO_2$ is supplied to the nozzles 141 of chilling heads 16. In leaving the pipes 17 and flowing through the discharge heads 16 into the atmosphere, the $CO_2$ first changes to a cloud of finely divided solid particles of $CO_2$ which are deposited upon the exposed surfaces of inserts 10 as such inserts are carried past the chilling head by the wheel 14. The wheel 14 and belt 19 shields substantially all of the inserts from the chilling medium except the end surfaces of the inserts. The coating of solid $CO_2$ particles on the end surfaces of the inserts then sublimates to a gas. As a result, the flash or burrs, and the exposed surfaces of the article as well, are chilled to such temperature that they become hard and brittle. The burrs are thus in optimum condition to be removed by being bent and broken, and the exposed surfaces of the articles are rendered so hard that the brushes have no effect upon them. The ends of the bristles of the brushes 20 during their rotation, and during the oscillation of the brushes past the outer ends of the passages in the article momentarily snap thereinto. Thus the burr-removing effect of the apparatus and method is not confined to the surface of the articles but extends into the passages to a substantial distance, sufficient fully to remove all of the molding flash therefrom.

Although the invention is not limited thereto, it would be well to point out some of the features of an apparatus which has been found to operate most satisfactorily. The brushes 20 are rotated at about 1200 r.p.m., and are oscillated across the article at a frequency such as to give three complete trips of the brush across each article as the article moves thereby. Although the gas such as $CO_2$ employed to freeze the exposed face of the article may be confined in tanks under high pressure at atmospheric temperature, it is preferred for reasons of economy to store such gas in larger tanks under refrigeration, thereby allowing the gas to be maintained in liquid condition under less pressure.

The apparatus of the invention may also be used to advantage with a cooling medium such as liquid nitrogen, which expands directly from a liquid to a gas. For such media it is advantageous to employ in the chilling heads 16 spray nozzles of somewhat different construction, which allows the liquid medium effectively to coat the surfaces to be chilled. One such alternative spray nozzle is shown in FIG. 9.

As there shown, the nozzle has a body 146 which has an internally threaded passage 147 extending thereinto from the rear end. Through the forward wall of body 146 there extend a plurality (three shown) of small passages 148 disposed in a vertical plane, the central passage being axial and the other two passages diverging upwardly and downwardly, respectively, so as to cover the vertical extent of inserts 10. There is preferably provided a flared hood 149 on body 146, such hood being adjustable toward and away from the path of travel of the inserts 10 being treated. The hood may be held in longitudinally adjusted position on the nozzle body by a screw threaded into such body, the screw extending through a longitudinal slot on hood 149 as indicated in FIG. 9.

When the apparatus of the invention is employed with a cooling medium such as liquid nitrogen, and with nozzles such as that shown in FIG. 9, the liquid medium travels out passages 148 of the nozzle and forms a liquid coating on the exposed surfaces of the inserts 10. Such liquid coatings then evaporate, and in so doing abstract a large amount of heat from the coated inserts, thereby chilling the flash or burrs on the inserts, and the exposed surfaces of the inserts as well, to such temperature that they become hard and brittle and the flash or burrs may readily be removed from the inserts by being bent with respect thereto.

There have been described two embodiments of the invention, that is, that (1) employing a gas which is initially a liquid, then changes to a solid, and then changes to a gas, and that (2) employing a gas which is initially a liquid and which changes directly to a gas. In both embodiments chilling of the articles takes place by subjecting the articles to a jet of expanding compressed gas fed from a pressure source of such gas.

Although a limited number of embodiments of the apparatus for deburring rubber articles, and method of deburring rubber articles, have been illustrated in the accompanying drawings and described in the foregoing specification, it is to be expressly understood that various changes, such as in the relative dimensions of the parts, materials used, and the like, may be made therein without departing from the spirit and scope of the invention as will now be apparent to those skilled in the art.

What is claimed is:

1. The method of removing burrs from a rubber-like article which comprises drastically chilling the burrs to render them hard and brittle, and then subjecting the burrs to bending and shearing forces to break them from the article by presenting a tool having a working surface to the article so that such working surface engages the burrs and at least lightly engages the surface of the article from which the burrs project, and moving the working surface of the tool and said surface of the article relatively to each other in a direction generally parallel to said surface of the article.

2. The method as defined in claim 1, wherein the surface of the article from which the burrs project is also chilled to render it hard and scratch resistant.

3. The method as defined in claim 1, wherein the chilling of the burrs is effected by subjecting them to a jet of chilled fluid fed from a pressure source of such fluid.

4. The method as defined in claim 1 comprising rotating the tool about an axis generally normal to the said surface of the article, transversing the article in a path extending generally at right angles to the axis of rotation of the tool, and holding the article from substantial rotation about its axis normal to said surface during the portion of its travel in which it is subjected to the action of said tool.

5. The method as defined in claim 1, comprising shielding the body of the article to prevent it from being markedly chilled during the burr-removing operation.

6. The method as defined in claim 1, comprising gripping the article and moving the article past said tool with the said surface of the article exposed to the action of the tool.

7. The method as defined in claim 1, wherein the article has a passage therein extending inwardly from the said surface, at least some of the burrs which project from the said surface of the article have roots attached to the article adjacent the outer edge of the passage, and wherein the working surface of the tool is resiliently yieldable so that portions of the tool momentarily project somewhat into the end of the passage in the article as the tool and article move relatively past each other, whereby the burrs attached to the article adjacent the outer edge of the passage therein are sheared from the article at their roots by the portions of the tool momentarily projecting into the end of the passage.

8. The method of removing flash burrs from a molded rubber-like article having a plurality of passages therein extending from a surface of the article, the burrs being located predominantly at the ends of the passages adjacent said surface, said method comprising subjecting said surface and the burrs to marked chilling whereby to render the burrs hard and brittle and the said surface of the article hard and scratch resistant, and then immediately thereafter subjecting said surface and burrs to the action of a rotary tool having a working surface which moves generally parallel to, and at least lightly engages, said surface of the article, whereby to bend and shear the burrs to break them from the article.

9. The method as defined in claim 8, comprising traversing the article in a path extending generally at right angles to the axis of rotation of the rotary tool, and holding the article from substantial rotation about its axis normal to said surface during the portion of its travel in which it is subjected to the action of said rotary tool.

10. The method as defined in claim 8, comprising chilling the burrs by subjecting them to a jet of chilled fluid fed from a pressure source of such fluid.

11. The method of removing flash burrs from a molded rubber-like article having a plurality of passages therein extending from a surface of the article, the burrs being located predominantly at the ends of the passages adjacent said surface, said method comprising subjecting said surface and the burrs to marked chilling whereby to render the burrs hard and brittle and the said surface of the article hard and scratch resistant, and then immediately thereafter subjecting said surface and burrs to the action of a brush rotating about an axis generally parallel to the axes of the bristles thereof and generally normal to said surface of the article so that the free ends of the bristles move generally parallel to and at least lightly engage said surface of the article to bend and shear the burrs to break them from the article.

12. The method of removing burrs from a rubber-like article having a passage therein extending inwardly from a surface thereof and at least some of the burrs having roots attached to the article adjacent the outer edge of the passage which comprises drastically chilling the burrs to render them hard and brittle, and then subjecting the burrs to bending and shearing forces to break them from the article by presenting a brush to the article so that the ends of the bristles thereof engage the burrs and the said surface of the article and at least some of the bristles momentarily project somewhat into the end of the passage in the article as the brush and article move relatively past each other, and moving the brush and the said surface of the article relatively to each other in a direction generally parallel to said surface of the article.

13. The method defined in claim 12, comprising rotating the brush about an axis generally parallel to the lengths of the bristles and generally normal to the said surface of the article.

14. The method defined in claim 13, comprising periodically moving the brush in a direction parallel to the surface of the article whereby to cause the ends of some of the bristles to snap into the end of the passage and the ends of others of the bristles to be withdrawn from the end of the passage as the brush and article travel relatively past each other.

15. The method of removing burrs from a rubber-like article which comprises drastically chilling the burrs to render them hard and brittle, and then subjecting the burrs to bending and shearing forces to break them from the article by presenting a tool having a working surface to the article so that the working surface engages the burrs and lies at least close to the surface of the article from which the burrs project, and moving the working surface of the tool and said surface of the article relatively to each other in a direction generally parallel to said surface of the article.

16. The method of removing burrs from a rubber-like article which comprises drastically chilling the burrs to render them hard and brittle, and then subjecting the burrs to bending and shearing forces to break them from the article by presenting a brush to the article so that the bristles thereof engage the burrs and at least lightly engage the surface of the article from which the burrs project, and moving the brush and said article relatively to each other in a direction generally parallel to said surface of the article by rotating the brush about an axis generally parallel to the axes of the bristles thereof and generally normal to the said surface of the article.

17. Apparatus for removing burrs protruding from a surface of a rubber-like article, which comprises means for gripping such article while exposing said surface, means for drastically chilling the burrs while the article is thus gripped to render the burrs hard and brittle, means to subject the chilled burrs to bending and shearing forces to break them from the article while the latter is thus gripped, said last-named means comprising a rotatable tool having a group of elongated yieldable elements, the free ends of which form a working surface engageable with said burrs and lightly engageable with said surface of the article, and means for moving the working surface of the tool and said surface of the article relative to each other in a direction generally parallel to said surface of the article, including means for rotating said tool and the working surface thereof about an axis generally normal to said surfaces.

18. Apparatus for removing burrs protruding from a surface of a rubber-like article, which comprises means for gripping such article while exposing said surface, means for causing the thus-gripped article to travel in a path, means for drastically chilling the burrs while the article is thus gripped to render the burrs hard and brittle, means to subject the chilled burrs to bending and shearing forces to break them from the article while the latter is thus gripped, said last-named means comprising a rotatable tool having a group of elongated yieldable elements engageable with the burrs as the surface of the article travels in said path relative to said elements, and means for rotating the tool about an axis generally parallel to the lengths of said elements and generally normal to said surface as the article travels past the tool in said path.

19. Apparatus as defined in claim 18, wherein the means for chilling the burrs comprises means for subjecting the burrs to a jet of chilled fluid fed from a pressure source of such fluid.

20. Apparatus as defined in claim 18, wherein the means for chilling the burrs also chills and hardens the said surface of the article, and means for oscillating said tool across said surface of the article transversely of the direction of movement of the latter in said path.

21. Apparatus for removing flash burrs from a molded rubber-like article having a passage therein extending from a surface of the article, the burrs being located predominantly at the end of the passage adjacent said surface, said apparatus comprising means for gripping said article while exposing said surface, means to subject the flash burrs and said surface to a jet of chilled fluid fed from a pressure source of such fluid, so as drastically to chill the burrs to render them hard and brittle and to chill said surface to render it hard and scratch resistant, means for moving the gripped article in a path, a brush having a working surface disposed close to the path of the said surface of the article, means for oscillating said brush and the working surface thereof across said surface of the article transversely of the direction of movement of the latter in said path, and means for rotating the brush so that it contacts the burrs and subjects them to bending and shearing forces to break them from the article.

22. Apparatus as defined in claim 21 wherein the means for gripping the article comprises a conveyor means having a plurality of similar article-receiving pockets therein, said pockets being sequentially presented to the brush as the conveyor travels thereby.

23. Apparatus for removing flash burrs from a molded rubber-like article having a passage therein extending from a surface of the article, the burrs being located predominantly at the end of the passage adjacent said surface, said apparatus comprising means for gripping the article while exposing said surface, means to subject the flash burrs and said surface to a jet of chilled fluid fed from a pressure source of such fluid so as drastically to chill the burrs to render them hard and brittle and to chill said surface to render it hard and scratch-resistant, conveyor means for moving the gripped article in a plane, a brush having a working surface disposed close to the path of the said surface of the article, said brush being disposed to rotate on an axis extending generally at right angles to said plane and having bristles extending generally at right angles to said plane, and means for rotating the brush so that it contacts the burrs and subjects them to bending and shearing forces to break them from the article.

24. Apparatus as defined in claim 23 comprising means for periodically moving the brush parallel to the plane of travel of the conveyor means and generally transversely to the direction of travel of articles mounted on the conveyor means in timed relationship with the travel of the conveyor means.

25. Apparatus as defined in claim 24, wherein the means for gripping the article engages the mid-portion of the article and exposes both end surfaces of the article, and wherein two similar brushes are mounted and moved in the same manner for removing flash burrs from the opposite ends of the article.

References Cited in the file of this patent

UNITED STATES PATENTS

| | | |
|---|---|---|
| 1,647,499 | Bly | Nov. 1, 1927 |
| 1,964,174 | Raiche | June 26, 1934 |
| 2,047,021 | Friden | July 7, 1936 |
| 2,062,106 | Reinhardt | Nov. 24, 1936 |
| 2,083,407 | Scrantom | June 8, 1937 |
| 2,203,937 | Barley | June 11, 1940 |
| 2,343,496 | Carroll | Mar. 7, 1944 |
| 2,956,717 | Scharf | Oct. 18, 1960 |

FOREIGN PATENTS

| | | |
|---|---|---|
| 871,991 | Germany | Mar. 26, 1953 |